United States Patent
Mazzarese et al.

(10) Patent No.: US 6,718,800 B2
(45) Date of Patent: Apr. 13, 2004

(54) METHOD OF COLLAPSING A TUBE FOR AN OPTICAL FIBER PREFORM

(75) Inventors: David Mazzarese, Warren, MA (US); George Edward Oulundsen, III, Belchertown, MA (US); Timothy Francis McMahon, II, Westfield, MA (US); Michael Thomas Owsiany, Southbridge, MA (US)

(73) Assignee: Fitel USA Corp., Norcross, GA (US)

( * ) Notice: Subject to any disclaimer, the term of this patent is extended or adjusted under 35 U.S.C. 154(b) by 20 days.

(21) Appl. No.: 09/488,088

(22) Filed: Jan. 20, 2000

(65) Prior Publication Data

US 2002/0157426 A1 Oct. 31, 2002

Related U.S. Application Data

(60) Provisional application No. 60/123,136, filed on Mar. 8, 1999.

(51) Int. Cl.[7] .............................................. C03B 37/07
(52) U.S. Cl. ............................ 65/384; 65/412; 65/417; 65/429; 65/428
(58) Field of Search ......................... 65/429, 419, 412, 65/384, 428

(56) References Cited

U.S. PATENT DOCUMENTS

| | | | |
|---|---|---|---|
| 4,557,561 A | | 12/1985 | Schneider et al. |
| 4,793,843 A | | 12/1988 | Pluijms et al. |
| 5,127,929 A | * | 7/1992 | Gunther et al. ............... 65/429 |
| 5,149,349 A | * | 9/1992 | Berkey |
| 5,236,481 A | * | 8/1993 | Berkey |
| 5,761,366 A | | 6/1998 | Oh et al. |
| 6,131,413 A | * | 10/2000 | Rousseau et al. |
| 6,220,060 B1 | | 4/2001 | Wisk et al. |
| 6,333,013 B1 | * | 12/2001 | Yoshida et al. ............. 423/335 |
| 2002/0078714 A1 | * | 6/2002 | Bird et al. .................... 65/427 |

FOREIGN PATENT DOCUMENTS

| | | | | |
|---|---|---|---|---|
| DE | 3315165 | * | 10/1984 | ................... 65/429 |
| EP | 163072 | * | 12/1985 | ................... 65/419 |
| GB | 2084988 | * | 4/1982 | |
| JP | 60-166244 | * | 8/1985 | ................... 65/419 |

OTHER PUBLICATIONS

T. Li, Optical Fiber Communications, vol. 1 (1985) pp. 26–30.

(List continued on next page.)

*Primary Examiner*—John Hoffmann
(74) *Attorney, Agent, or Firm*—Law Office of Leo Zucker

(57) ABSTRACT

The present invention provides a method of preparing preforms for optical fibers. The invention allows one to remove or significantly reduce undesirable refractive index variations in the central portion of the optical fibers. The method of preparing the preform having a central duct includes the steps of a first collapsing step, an etching step and a second collapsing step. The first collapsing step reduces the size of the central duct without closing the central duct by heating the preform at a first preform collapsing temperature. A portion of the last deposited layer of the core glass layers is etched by flowing an etchant gas through the central duct at a lower temperature than the preform collapsing temperature. The preform is finally collapsed at a second collapsing temperature to close the central duct of the preform and form a solid rod.

12 Claims, 6 Drawing Sheets

OTHER PUBLICATIONS

IRCON, Brochure (two pages) for IRCON Preform Software, and Press Release (one page) (2002).

H. Schneider et al., *A New Method to Reduce the Central Dip and the OH content in MCVD Preforms*, Enropean Conference on Optical Communication, 1982, Session A II: Technology (1), p36–40.

D. Marcuse et al., *Effects of Profile Deformations on Fiber Bandwidth*, Reprinted from Appl. Opt., vol. 18, pp 3758–3763, Nov. 1979, p 92–97.

D. Marcuse, *Calculation of Bandwidth from Index Profiles of Optical Fibers. 1: Theory*, Applied Optics vol. 18, No. 12, Jun. 1979, p 2073–2080.

H. M. Presby et al., *Calculation of Bandwidth from Index Profiles of Optical Fibers: 2: Experiment.*, Applied Optics vol. 18, No. 19, Oct. 1979, p 3249–3255.

D. Marcuse, *Calculation of Bandwidth from Index Profiles of Optical Fibers: Correction*, Applied Optics vol. 19, No. 2, Jan. 1980, p 188–189.

D. Marcuse, *Principles of Optical Fiber Measurements*, published by Academic Press, Inc. (London) ltd. (1981) pp. 4–5, 148–149 and 300–305.

U.S. patent application Ser. No. 09/398,470, filed Sep. 17, 1999, pending.

U.S. patent application Ser. No. 09/488,008, filed Jan. 20, 2000, pending.

\* cited by examiner

METHOD OF COLLAPSING A TUBE FOR AN OPTICAL FIBER PREFORM

RELATED APPLICATIONS

The present application claims the priority of U.S. provisional patent application No. 60/123,136, entitled "Method to Manufacture Optical Fibers," filed on Mar. 8, 1999.

FIELD OF THE INVENTION

The present invention relates to a method of preparing preforms for optical fibers. More particularly, the invention relates to a method to remove or significantly reduce undesirable refractive index variations in the central portion of the optical fibers.

BACKGROUND OF THE INVENTION

One of the processes in manufacturing a glass optical fiber is to collapse a preform having a central duct into a solid glass rod. During the process of closing the central duct, volatile dopants, such as germanium, are desorbed or released from one location of the preform structure. These dopant molecules are then either redeposited at another location or transported out of the preform. Due to the redeposition and/or transportation of these dopants, an undesirable refractive index deviation at the center of the core is formed. FIG. 1 demonstrates a refractive index profile of a multimode glass optical fiber in the prior art. The refractive index deviation takes the form of spikes or dips. Such refractive index deviation is detrimental in high-speed systems with restricted launch conditions.

Hence, one has tried to solve this problem in the prior art. U.S. Pat. No. 4,793,843 discloses a method of manufacturing an optical fiber preform. In the process described therein, a gaseous etchant consisting of a combination of oxygen and a fluorocarbon compound $C_2F_6$ flows through a central duct of the preform when the preform is heated to collapse. That is, the etching occurs at the same time when the preform is collapsed. Hence, during the etching, the activated processes of fluorine diffusion into the glass structure and volatization of germanium occur because the etching is done at collapsing temperatures. U.S. Pat. No. 4,793,843 specifies that the central duct is approximately equal to one millimeter before the gaseous etchant is passed through the central duct. When the central duct size is small, the risk to cause the duct to close due to surface tension makes the process difficult to control. If the duct closes prematurely while forming the preform, it may cause the increase of the glass attenuation and undesirable airlines may be formed within the preform. Although the resulting solid preform and optical fibers drawn from the preform have an improved refractive index profile, U.S. Pat. No. 4,793,843 is limited to the etching with $C_2F_6$. Moreover, it is specifically disclosed that etching with $SF_6$ at collapsing temperatures is not as effective as etching with $C_2F_6$ at the collapsing temperatures. In other prior art (e.g., U.S. Pat. Nos. 5,761,366; 4,557,561; and Scheneider et al., Proceedings of ECOC 1982) etching with $SF_6$ during collapse is disclosed, but not as a separate step from collapsing.

SUMMARY OF INVENTION

The present invention provides a method to remove or significantly reduce undesirable refractive index variations in the central portion of the optical fibers. A method of preparing a preform for an optical fiber according to the present invention comprises the following steps. A preform having a central duct is heated at a first collapsing temperature to reduce the size of the central duct. The surface of the central duct is then etched at a temperature lower than the minimum collapsing temperature of the preform to remove a portion of deposited core materials. Finally, the preform is heated again at a second collapsing temperature to collapse completely the central duct of the preform. The etching step is performed by flowing an etchant gas through the central duct. The etchant gas comprises a mixture of oxygen and $SF_6$. The temperature for etching is preferred to be about 200–400° C. lower than the minimum collapsing temperature of the preform. The etching temperature is about 1600–2000° C. in the invention.

In a first embodiment of the present invention, three collapsing passes are performed through a traversing torch in the direction from the preform intake to the preform exhaust at a temperature of 2150±100° C. at decreasing torch traverse speeds in the first heating/partial collapsing step. The etching step is performed by flowing an etchant gas at about 1800° C. through the central duct. The etchant gas comprises a mixture of 6 sccm of $SF_6$ and 194 sccm of $O_2$. Then, the preform is finally collapsed at a temperature of 2200±100° C.

In a second embodiment of the present invention, three collapsing passes are performed through a traversing torch in the direction from the preform intake to the preform exhaust at a temperature of 2250±150° C. at decreasing torch traverse speeds. The etching step is performed by flowing an etchant gas at about 1800° C. through the central duct. The etchant gas comprises a mixture of 6 sccm of $SF_6$ and 194 sccm of $O_2$. In the final collapsing step, the preform is collapsed at a temperature of 2220±100° C.

In a third embodiment of the present invention, three collapse passes are performed through a traversing torch in the direction from the preform exhaust end to the intake end while the exhaust end is plugged with a device to prevent gases from exiting the preform. Then, the device is removed from the exhaust end, and the etching step is performed by flowing an etchant gas of 6 sccm of $SF_6$ and 194 sccm of $O_2$ while the preform is heated at a temperature of 1800±150° C. Finally, the preform is collapsed at 2200±100° C. to form a solid rod.

BRIEF DESCRIPTION OF THE DRAWINGS

The features and elements of the present invention will be better understood from the following detailed description of preferred embodiments of the invention in which.

DETAILED DESCRIPTION OF PREFERRED EMBODIMENTS

The present invention discloses a method to prepare a preform without having substantial refractive index variations such as spikes, dips and/or plateaus at the center of refractive index profile. This goal is accomplished by partially collapsing the preform which has a central duct, etching a portion of the last deposited layer of the core at a temperature lower than a minimum collapsing temperature of the preform and finally collapsing the preform to form a solid rod. When an optical fiber is drawn from a preform prepared in accordance with the invention, the optical fiber exhibits a refractive index profile with greatly reduced central defects. When the inventive procedure is optimized, it produces a smooth refractive index in the center of the optical fiber.

Figure 5:
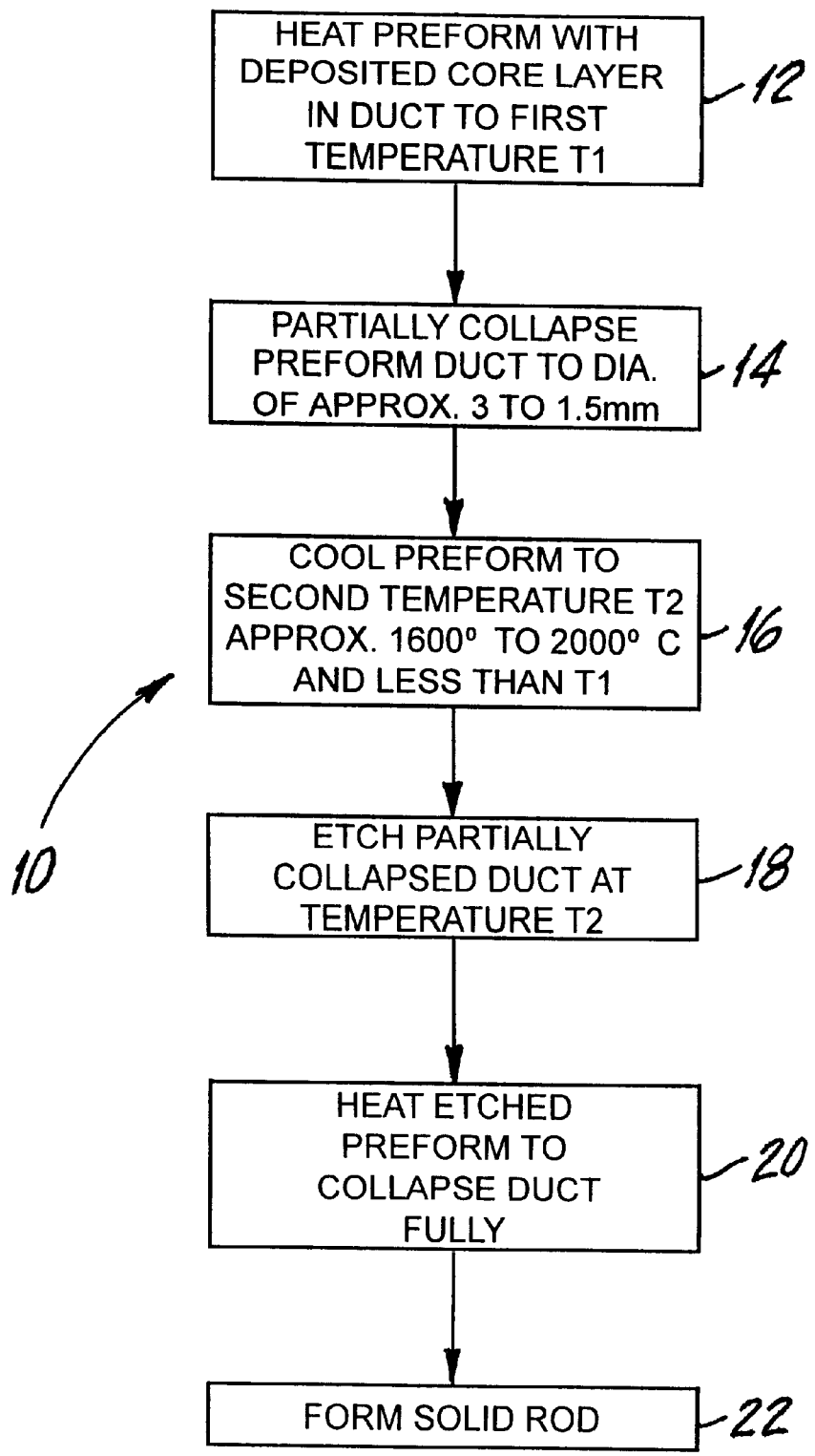
FIG. 5 is a flow chart showing steps of the present invention.

FIG. 5 is a flow chart 10 showing various steps of inventive method. In step 12, a preform having a central duct with a last-deposited core layer on a surface of the duct, is heated to a first temperature T1. The temperature T1 is approximately 2150° C. to 2250° C. and is sufficient to initiate a partial collapse of the central duct. The preform is heated at temperature T1 until the duct collapses (at step 14) to a diameter of approximately 3 to 1.5 mm. In step 16, the preform is cooled to a second temperature T2 of approximately 1600° C. to 2000° C. and which is lower than the first temperature T1 so as to inhibit further collapse of the duct.

Figure 6:
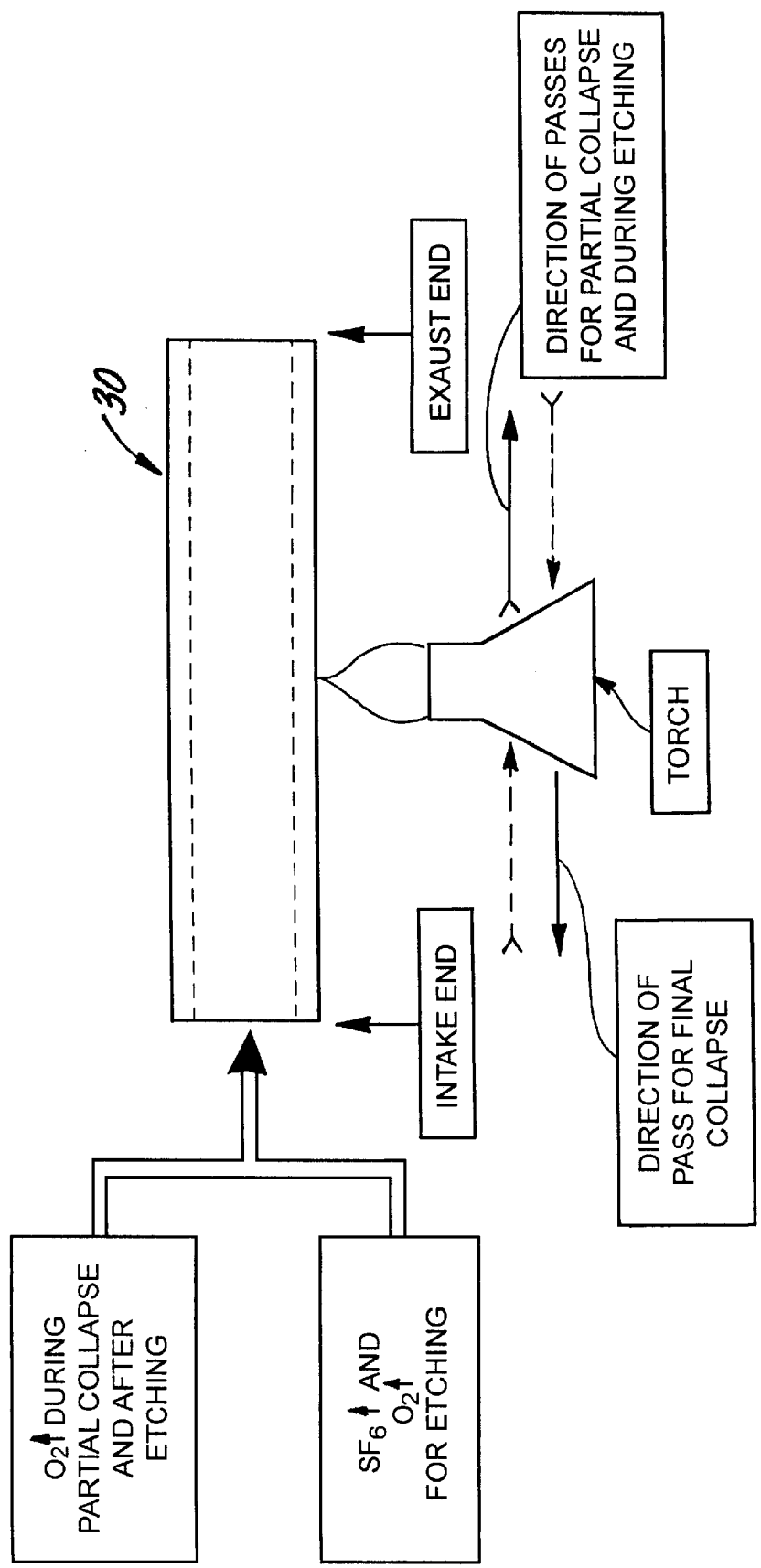
FIG. 6 shows a preform to which the present method is applied according to first and second embodiments of the invention.

The partially collapsed duct is etched at the second temperature T2 in step 18 to remove a portion of the deposited core layer. Once the etching step 18 is completed, the preform is further heated at step 20 to a temperature sufficient to collapse the central duct fully. A solid preform rod is thus formed at step 22. FIG. 6 shows a preform 30 that is being prepared according to steps in FIG. 5, and particularly as described in first and the second embodiments of the invention described below.

According to one aspect of the invention, a mixture of oxygen and $SF_6$ is used as an etchant gas during the etching step. This mixture of gases decomposes yielding a higher concentration of F atoms at lower temperatures than fluorinated hydrocarbons suggested in the prior art (U.S. Pat. No. 4,793,843) because $SF_6$ molecules have lower bond energies. Thus, the etching step in the invention occurs at 200–400° C. lower than the minimum collapsing temperature. Moreover, because of the lower temperature etching, the present invention significantly reduces diffusion of fluorine into the glass and volatilization of germanium during the etching step. The etchant gas has a flow rate of 3.0–60.0 sccm for $SF_6$ and 50–1500 sccm for oxygen. The etch rate during the etching step ranges from 0.003 $cm^3$/min.–0.08 $cm^3$/min.

According to another aspect of the invention, the present invention allows a considerably larger airline size due to a lower processing temperature than those in the prior art. The mixture of gases decomposes at relatively low temperatures and allows etching on the central duct significantly larger than what is used in the prior art, thereby creating a significantly more robust process. The lower temperature reduces the diffusion length for fluorine into the glass matrix. Thus, the absolute size of the airline is less critical than what is described in the prior art. An optical preform manufactured in accordance with the present invention does not have apparent central dips even when the central duct is as large as 5 mm. The etch temperature is approximately 1600–2000° C., preferably at 1800° C. The separation of the etching step at a lower temperature from the collapsing step at a higher temperature in the invention makes it easier to keep the central duct open during the etching step. This is a significant advantage when a large-scale production of the preforms is adopted.

The present invention is used to prepare both multimode and singlemode preforms manufactured by a modified chemical vapor deposition (MCVD) process (see, e.g., U.S. Pat. No. 4,334,903). A MCVD preform without a center dip in the refractive index profile is prepared by the following steps:

(i) Use MCVD process to deposit a barrier and core glass layers on the inner face of a quartz substrate tube to form a preform having a central duct;

(ii) Heat the preform to reduce the size of the central duct at a first collapsing temperature;

(iii) Flow an etchant gas through the central duct at a temperature about 200–400° C. lower than a minimum collapsing temperature to etch a portion of the deposited core from the central duct of the preform; and (iv) Completely collapse the central duct of the preform at a second collapsing temperature.

The present invention is now explained below with a detailed description of preferred embodiments of the present invention in association with figures. Note that collapsing temperatures are defined as temperatures which result in the slow viscous flow of molten glass towards the center of the tube, driven by forces due to surface tension, causing a reduction in the tube diameter.

Embodiment 1

A graded index MCVD multimode preform is manufactured from a Heraeus Synthetic Quartz substrate tube. Glass layers for the core are deposited in the inner face of the tube through the MCVD process to form the preform having a central duct. The preform is heated to be partially collapsed to reduce the size of the central duct by using 3 collapsing passes. The partial collapsing passes are conducted through an externally traversing torch in the direction from the intake end of the preform to the exhaust end at decreasing torch traverse speeds. The traverse speeds for these three passes in an illustrative example are approximately 3.7 cm/min. for the first pass; approximately 2.9 cm/min. for the second pass; and approximately 1.7 cm/min. for the third pass. The collapsing temperatures for the three passes are at about 2150±100° C. Oxygen flows through the central duct at a rate of at least 200 sccm during all three collapse passes. During the partial collapsing step, volatile dopants such as Ge and P diffuse out of the glass matrix. The central duct diameter is approximately 3 mm.

The region of glass with depleted dopants in the center portion of the preform is now etched. Etching is performed by flowing an etchant gas comprising a mixture of 6 sccm of $SF_6$ and 194 sccm of $O_2$ through the central duct while it is heated at a temperature of approximately 1800° C. The torch traverses in the direction from the preform's intake end to the exhaust end at a torch traverse speed of approximately 1.2 cm/min. to 21.0 cm/min., preferably 2.1 cm/min. during the etching step. The etch rate in this example is approximately 0.01 $cm^3$/min. At these etching conditions the central duct of the preform does not collapse. This lower temperature is important because it minimizes diffusion of fluorine into the glass and volatilization of the dopants. When the etching step of the invention is performed, the inner diameter of the tube can be as large as 5 mm. After the etching step is completed, the central duct is closed at the exhaust end of the preform while 300 sccm of $O_2$ flows to the central duct. This oxygen flow is reduced to zero as the central duct is closed. Finally, the preform is collapsed into a solid rod. The temperature is approximately 2200±100° C. in the portion of the preform being collapsed. The central duct is closed along the length of the preform using a final collapse pass in the direction from the exhaust to the intake. The traverse speed for the final reverse collapse pass is about 1.9 cm/min. But a faster traverse speed may be used as long as the central duct closes in one reverse collapse pass. The entire collapsing and etching steps take about 3 or 5 hours depending on the tube diameter and the length of the tube.

Embodiment 2

A MCVD singlemode preform is manufactured from a 19×25 mm Heraeus Synthetic Quartz substrate tube. Glass layers are deposited as the core in the inner face of the tube using MCVD to form the preform having a central duct.

The preform is partially collapsed to reduce the size of the central duct by using 3 collapsing passes. The partial collapsing was conducted by an external traversing torch in the direction from the intake end of the preform to the exhaust end at decreasing torch traverse speeds. In an illustrative example, the traverse speeds respectively are about 2.6 cm/min. for the first pass; approximately 1.8 cm/min. for the second pass; and approximately 1.0 cm/min. for the third pass. The collapsing temperatures for the 3 passes are about 2250±150° C. Oxygen flows through the central duct at a rate of at least 200 sccm during all three collapse passes. During the partial collapsing process, volatile dopants such as Ge and P diffuse out of the glass matrix. The resulting central duct diameter is approximately 1.5 mm.

The region of glass with depleted dopants in the center portion of the preform is etched. Etching is performed by flowing an etchant gas comprising a mixture of 6 sccm of $SF_6$ and 194 sccm of $O_2$ through the central duct while it is heated at a temperature of approximately 1800° C. The torch traverses in the direction from the preform's intake end to the exhaust end at a torch traverse speed of approximately 3.8 cm/min. during the etching step. The etch rate in this example is approximately 0.01 $cm^3$/min. At these etching conditions, the central duct of the preform does not collapse. This lower temperature is important because it minimizes diffusion of fluorine into the glass and volatilization of the dopants.

After the etching step is completed, the central duct is closed at the exhaust end of the preform while 300 sccm of $O_2$ flows to the central duct. This oxygen flow is reduced to zero as the central duct is closed. Finally, the preform is collapsed into a solid rod. The central duct is closed along the length of the preform using a final collapse pass in the direction from the exhaust end to the intake end. The temperature is approximately 2200±100° C. in the portion of the preform being collapsed. The traverse speed for the final reverse collapse pass is about 0.5 cm/min. although faster is better as long as the central duct closes in one reverse collapse pass. The entire collapsing and etching process take about 5–7 hours depending on the tube diameter and the length of the tube.

Embodiment 3

A graded index MCVD multimode preform using a Heraeus Synthetic Quartz substrate tube is manufactured. Glass layers for the core are deposited in the inner face of the tube using the MCVD process to form the preform having a central duct.

After deposition of the glass layers, the exhaust end of the preform is plugged with a device to prevent gases from exiting the preform. The preform is then partially collapsed to reduce the central duct by using 3 collapse passes. The partial collapsing passes are conducted by an external traversing torch in the direction from the end of the preform exhaust to the intake end at decreasing torch traverse speeds. The traverse speeds in an illustrative example are approximately 2.0 cm/min. for the first pass; approximately 2.0 cm/min. for the second pass; and approximately 1.4 cm/min. for the third pass. The collapsing temperatures for the 3 passes are about 2150±100° C. During the collapse process, a stagnant $O_2$ environment is maintained within the tube. During the partial collapse step, volatile dopants such as Ge and P diffuse out of the glass matrix. The resulting central duct diameter is approximately 3 mm. after this partial collapsing.

The region of glass with depleted dopants in the center portion of the preform is etched. Etching is performed by flowing an etchant gas comprising a mixture of 6 sccm of $SF_6$ and 194 sccm of $O_2$ while the preform is heated at approximately 1800±150° C. The device plugged at the exhaust end of the preform is removed to allow the gas to flow through the central duct tube. The torch traverses in the direction from the intake end to the exhaust end at a torch traverse speed of approximately 2.1 cm/min. during the etching step. At these etching conditions, the central duct does not collapse. This lower temperature is important because it minimizes diffusion of fluorine into the glass and volatilization of the dopants. The etch rate in this example is approximately 0.01 $cm^3$/min. Under the etching condition of this invention, the inner diameter of the central duct can be as large as 5 mm.

After the etching step is completed, the central duct is closed at the exhaust end of the preform while 300 sccm of $O_2$ flows to the central duct. This oxygen flow is reduced to zero as the central duct is closed. Finally, the preform is collapsed into a solid rod. The central duct is closed along the length of the preform using a final collapse pass in the direction from the exhaust to the intake. The temperature is approximately 2200±110° C. in the portion of the preform being collapsed. The traverse speed for the final reverse collapse pass is about 1.9 cm/min. But it may be even faster as long as the central duct closes in one collapse pass.

Figure 1:
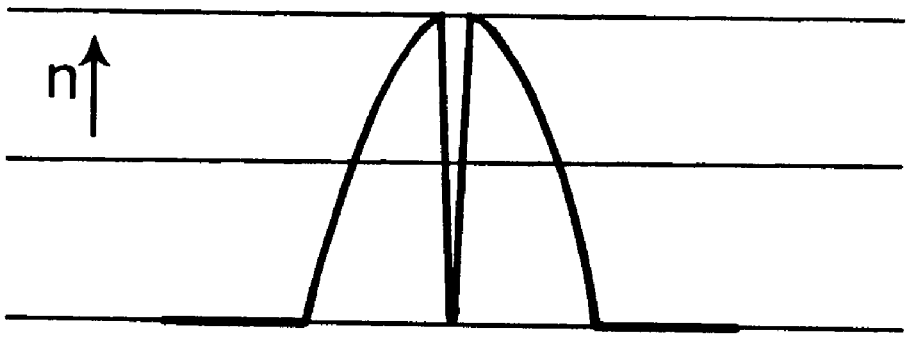
FIG. 1 is a refractive index profile for a prior art multimode fiber prepared in accordance with a conventional method.
Figure 2:
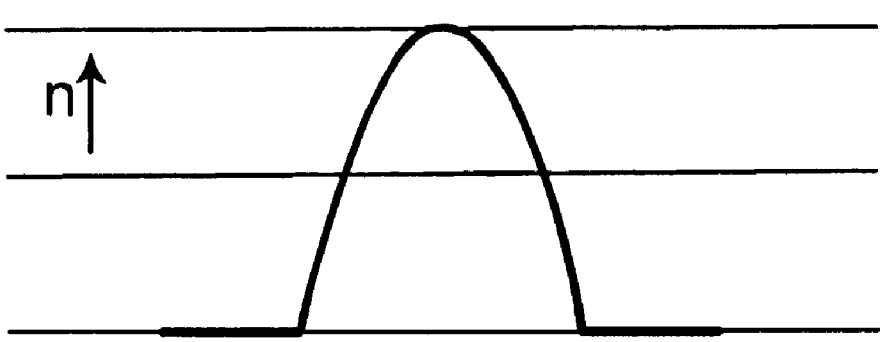
FIG. 2 is a refractive index profile for a multimode fiber prepared in accordance with the present invention.

FIG. 2 shows a representation of the refractive index profile for a multimode fiber manufactured according to the present invention. It is evident that under the method of the invention, there is no dip in the center part of the preform in refractive index.

Figure 3:
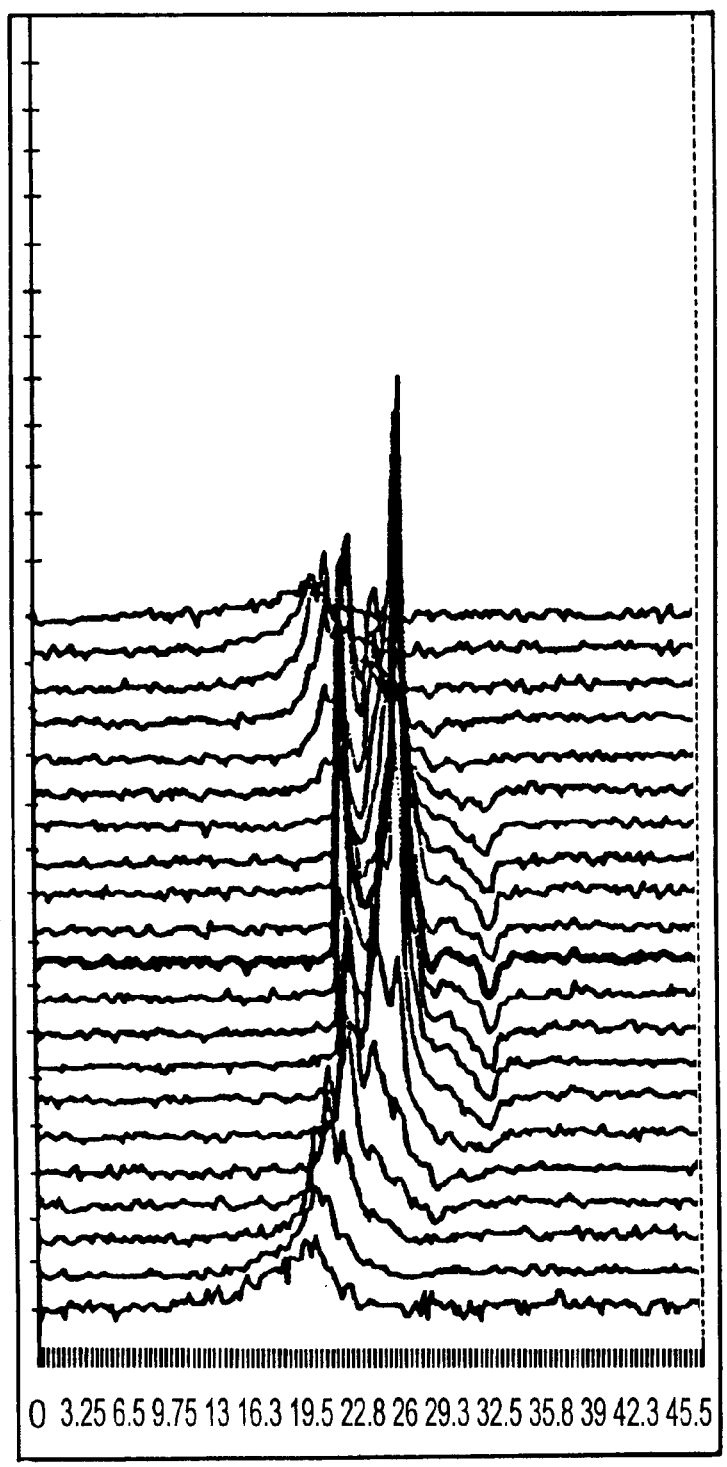
FIG. 3 is a differential mode delay diagram for a prior art optical fiber.
Figure 4:
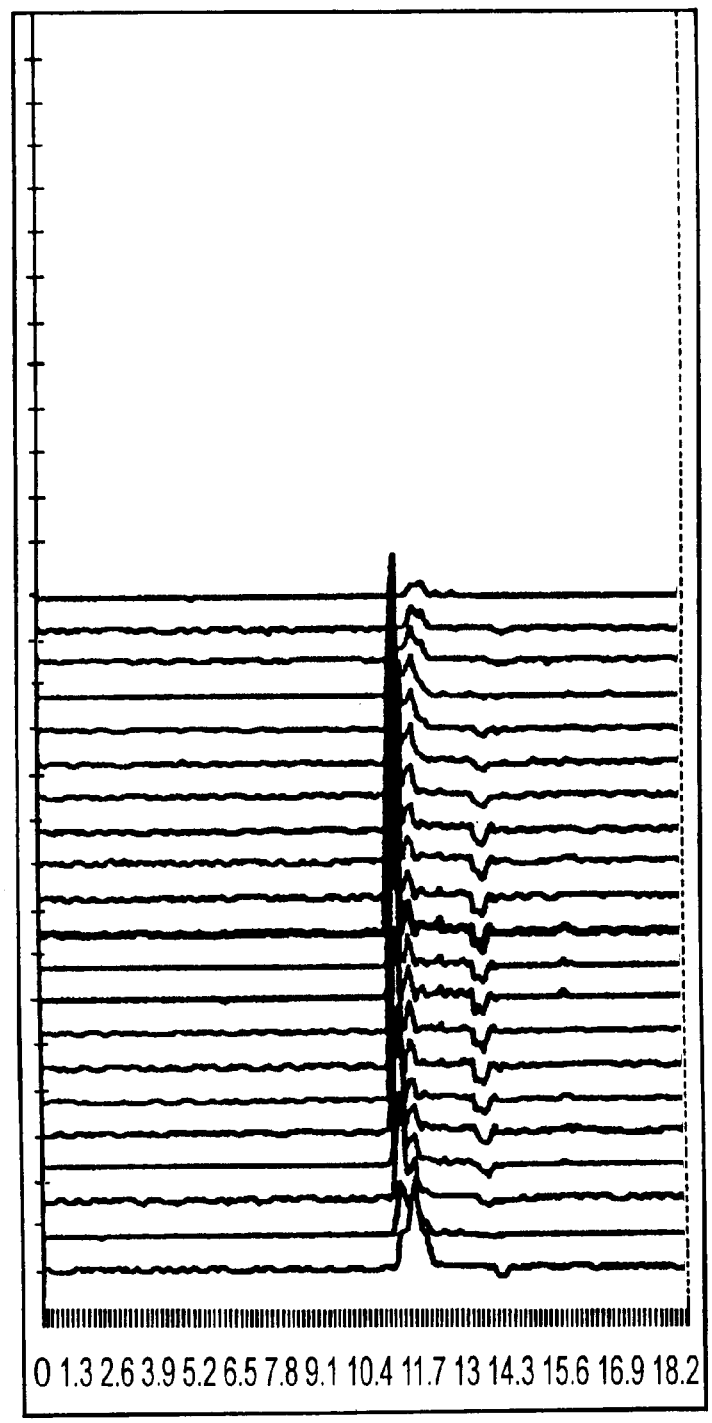
FIG. 4 is a differential mode delay diagram for an optical fiber produced in accordance with the present invention.

FIG. 3 shows a differential mode delay diagram for fibers produced by a prior art MCVD process and FIG. 4 shows a differential mode delay diagram for fibers produced by the present invention. These are actual data from fibers generated with and without the invention. The X-axis in the horizontal direction is time in nanoseconds. The Y-axis in the vertical direction is radius in microns with the bold line being the center of the fiber. The Z-axis which is perpendicular to the plane of the paper is the relative intensity. The dual pulse shown in FIG. 3 is an undesirable effect that may be detrimental in high-speed systems with restricted launch conditions. When the profile shape is optimized as shown in FIG. 2, this effect can be minimized.

By minimizing any defects in the center of the refractive index profile such as central dips, bumps and/or plateaus this effect can be minimized. These defects can be removed by this invention. Multimode fibers with no central dip have the additional advantage that the requirement of an offset patch cord is no longer required when the fiber is used in 1000 BASE-LX systems as described in the IEEE 802.3z standard.

The method described in this invention can be used to minimize deviations in the central portion of the index profile. This process was developed for the MCVD process but is applicable to all glass optical waveguide preforms requiring the closure of a central duct including those fabricated using PCVD (plasma-enhanced chemical vapor deposition), and OVD (outside vapor deposition) processes. Control of the center portion of the profile allows one to manufacture fiber that is closer to theoretically calculated profiles. This added capability makes it easier to manufacture multimode and singlemode fibers with enhanced performance. One example of the utility of this invention is less pulse splitting in the center of a graded index multimode fibers that uses this invention. Another is better control of waveguide characteristics including mode field diameter and dispersion characteristics for singlemode fibers that use this invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method of preparing a preform for an optical fiber, the preform having a central duct with a last-deposited core layer on a surface of the duct, an intake end and an exhaust end, comprising:

first heating the preform at a first temperature of at least about 2150+/−100° C. and which is sufficient to initiate a partial collapse of the central duct;

partially collapsing the central duct while performing the first heating step until the central duct has a diameter between approximately 3 and 1.5 mm;

etching the partially collapsed duct at a second temperature of approximately 1600° C. to 2000° C. and which is lower than the first temperature by an amount sufficient to keep the duct in an open condition while removing a portion of the core layer last-deposited on the surface of the duct; and second heating the preform at a temperature sufficient to collapse the duct of the preform fully after the etching step, thus forming a solid preform rod.

2. The method of claim 1, wherein the etching step is performed by flowing an etchant gas through the central duct of the preform.

3. The method of claim 2, including providing the etchant gas as a mixture of oxygen and $SF_6$.

4. The method of claim 3, wherein said oxygen has a flow rate of about 50 to 1500 sccm, and said $SF_6$ has a flow rate of about 3.0 to 60.0 sccm.

5. The method of claim 1, including performing the etching step at a rate of about 0.003 to 0.08 $cm^3$/min.

6. The method of claim 1, wherein the etching step is performed by traversing a heating source external to the preform at a relative traverse speed of about 1.2 cm/min. to 21.0 cm/min.

7. The method of claim 1, including closing the exhaust end of the preform while performing the second heating step.

8. The method of claim 1, wherein the partially collapsing step is performed using successive passes of an external torch by traversing the preform in the direction from the intake end to the exhaust end at decreasing traverse speeds for each pass.

9. The method of claim 8, including using three successive passes of said torch at traverse speeds of about 2.0 to 3.7 cm/min. for a first pass, about 1.8 to 2.9 cm/min. for a second pass, and about 1.0 to 1.7 cm/min. for a third pass.

10. The method of claim 9, including flowing oxygen through the central duct of the preform at a rate of at least 200 sccm during the three successive passes.

11. The method of claim 1, wherein the partially collapsed duct is etched while the second temperature is approximately 1800° C.

12. The method of claim 1, wherein the preform is fully collapsed during the second heating step at a temperature of approximately 2200+/−100° C.

* * * * *